Nov. 7, 1950            E. W. AUSTIN            2,529,124
EARTH MOVER
Filed Aug. 2, 1944                                3 Sheets-Sheet 1
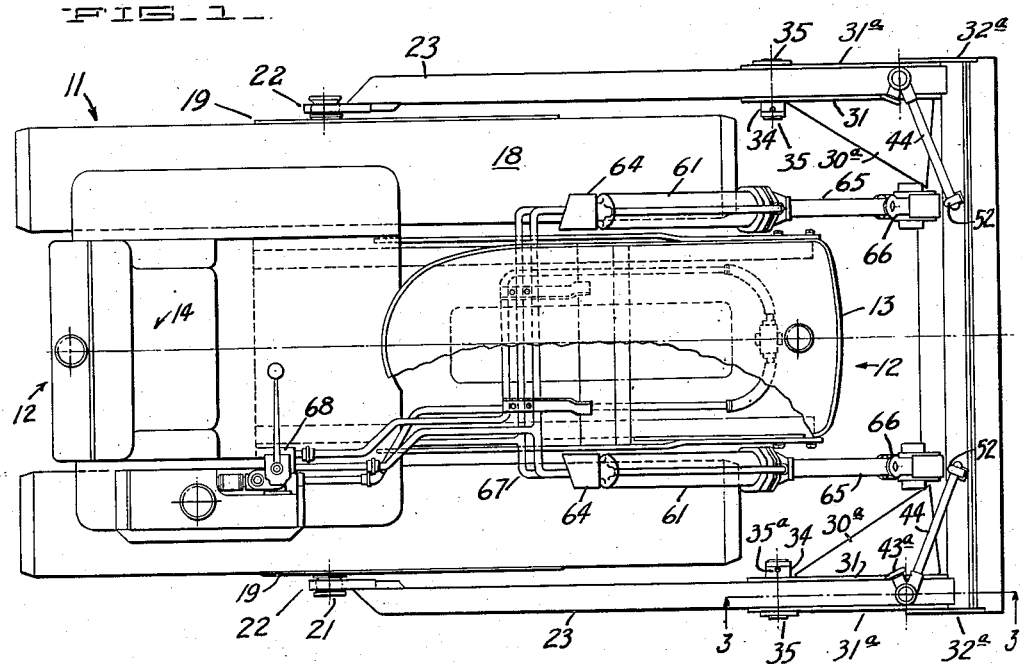
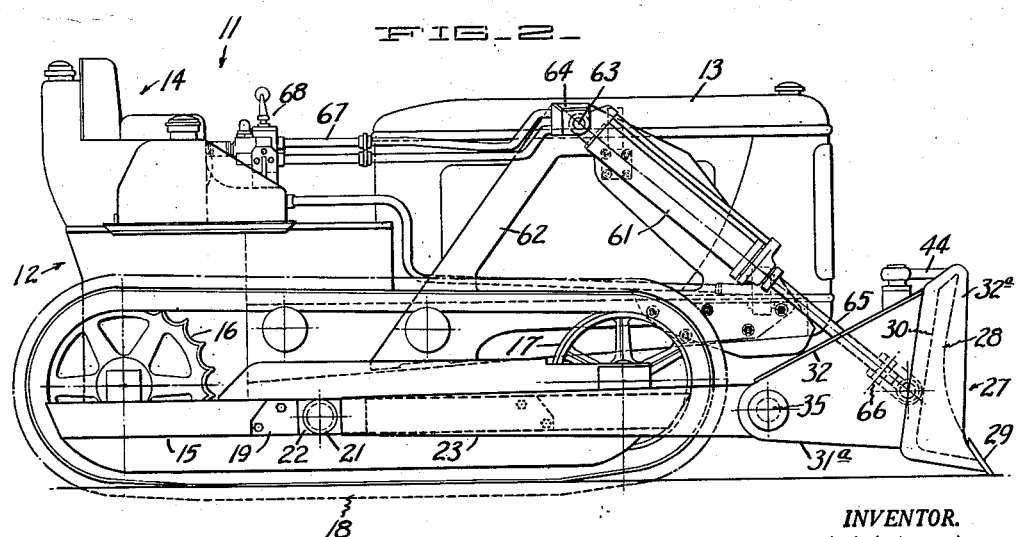
INVENTOR.
Ellsworth W. Austin
BY
*Attorney*

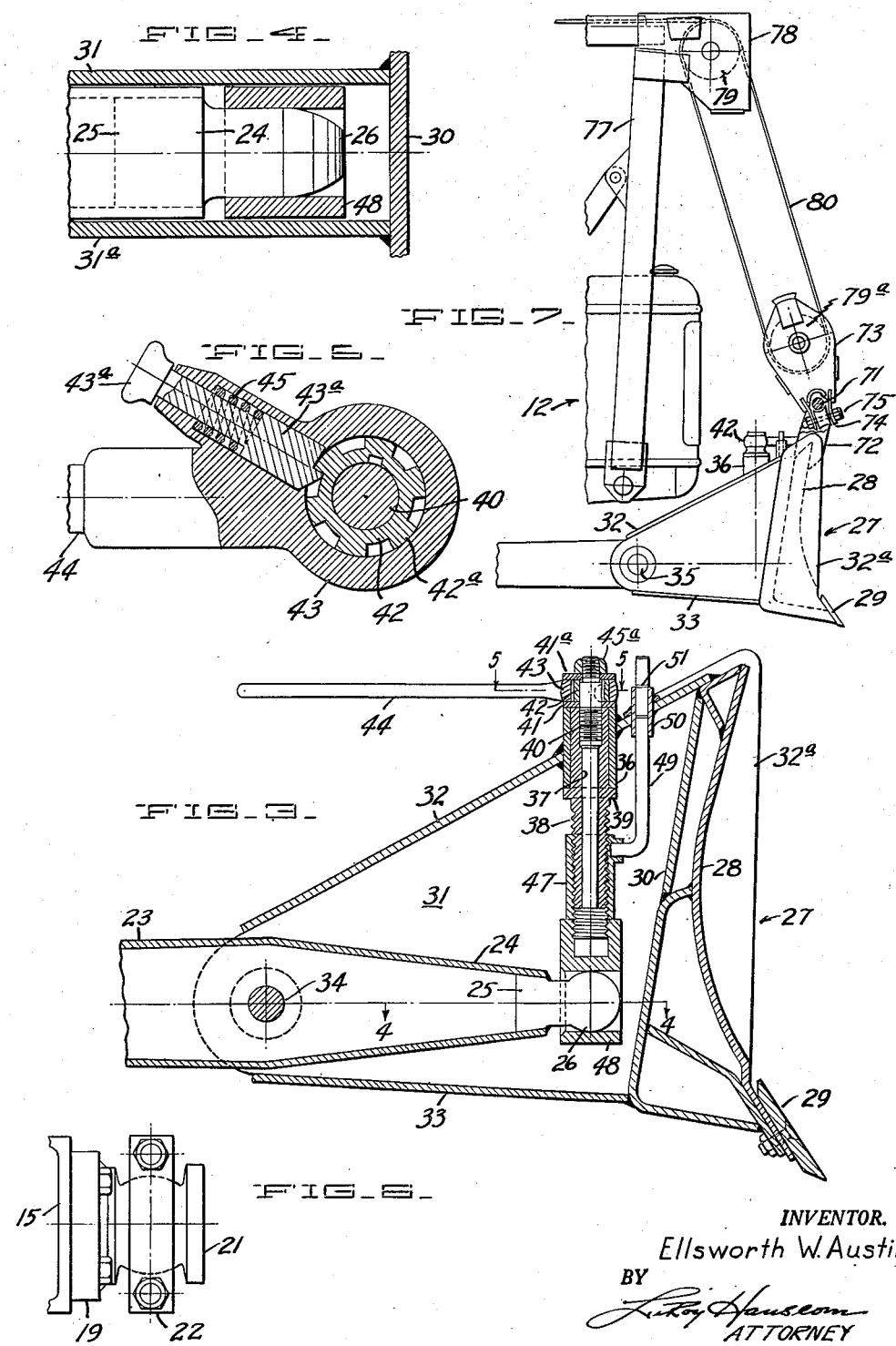

Nov. 7, 1950   E. W. AUSTIN   2,529,124
EARTH MOVER
Filed Aug. 2, 1944   3 Sheets-Sheet 3
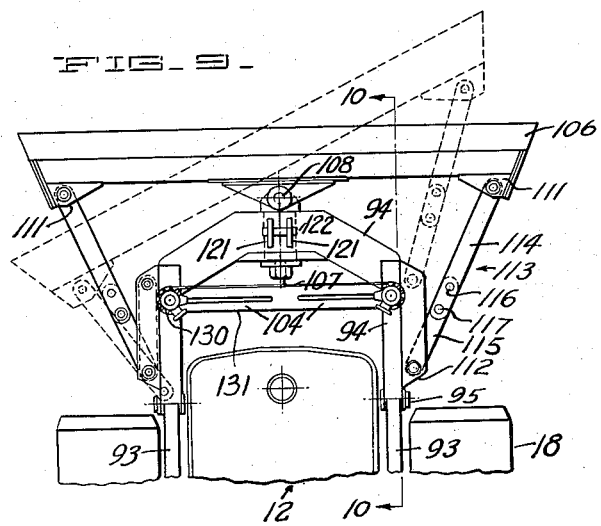
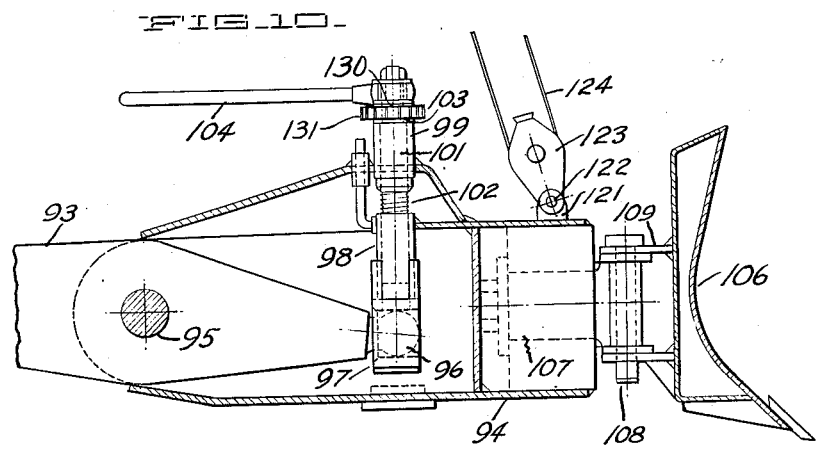
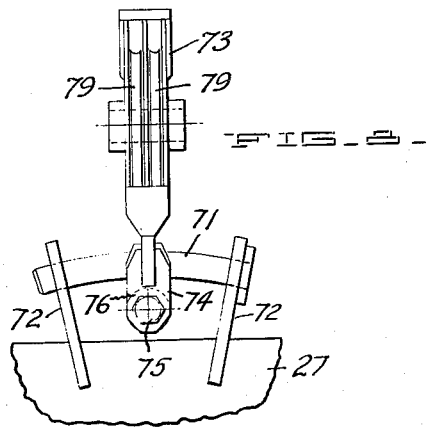
INVENTOR.
Ellsworth W. Austin
BY
ATTORNEY Patented Nov. 7, 1950

2,529,124

UNITED STATES PATENT OFFICE 2,529,124

EARTH MOVER

Ellsworth W. Austin, Cedar Rapids, Iowa, assignor to La Plant-Choate Manufacturing Co., Inc., Cedar Rapids, Iowa, a corporation of Delaware Application August 2, 1944, Serial No. 547,751

2 Claims. (Cl. 37—144)

This invention relates in general to earth moving equipment such as, for example, bulldozers, and more particularly to the manner of mounting the implement blade of such equipment.

One of the principal objects of the invention is to provide an adjustable mounting wherein the implement may be tilted in respect to the ground so that one end only may be used for removing material, such as in forming drainage ditches.

Another object of the invention is to provide means wherein the tilting adjustment of an implement may be made from one side of the tractor independently of the other side of the tractor.

A further object of the invention is the provision in a bulldozer of an implement which may be tilted on an axis substantially coaxial with the axis of the bulldozer by a combination of adjustments at the ends of the implement.

Still another object of the invention is the provision in a bulldozer of a readily detachable bulldozer implement so arranged that it can be swung about a central vertical axis in advance of the bulldozer frame, the frame being arranged to tilt the implement by an adjustment at one side of the frame, or the other side of the frame, or both.

Another object of the invention is to provide a machine suitably adjustable for various types of earth moving wherein the implement may have its digging angle adjustable in respect to the ground.

Another object of the invention is to provide a bulldozer having its frame members easily detachable for transportation.

The invention involves a novel arrangement of screw jacks, and the means for operating them, in such a fashion that the effectiveness of the device is greatly enhanced.

The foregoing and other objects of the invention are attained in the embodiment illustrated in the drawings, in which:

Figure 1 is a top plan view of a bulldozer embodying the objects of my invention.

Figure 2 is a side elevation of the bulldozer shown in Figure 1.

Figure 3 is a vertical section taken on the line 3—3 of Figure 1.

Figure 4 is an enlarged vertical section taken on the line 4—4 of Figure 3.

Figure 5 is a detailed plan view on an enlarged scale of the ratchet device taken along line 5—5 of Figure 3.

Figure 6 is an enlarged detail view of the ball and socket connection employed between the tractor side frames and the rear ends of the push arms.

Figure 7 is a fragmentary side elevation of a cable operated bulldozer embodying the objects of my invention.

Figure 8 is an enlarged front elevation of the sheave mounting used in connection with the cable operated machines shown in Figure 7.

Figure 9 is a top plan view of still another form of bulldozer embodying the objects of my invention.

Figure 10 is an enlarged section taken on the line 10—10 of Figure 9.

In each form of the invention and more particularly as shown in Figures 1 and 2, the tractor used is of the track laying type and is designated by the reference numeral 11, and comprises a main body portion generally designated by the reference numeral 12, an engine housing 13, and an operator's station 14. Disposed on either side of the tractor main body portion in spaced relation thereto are track frames 15, provided with drive sprockets 16 and idlers 17. Trained about the drive sprockets 16 and idlers 17 are ground engaging tracks 18. The track frames 15 are pivotally attached to the main body portion of the tractor in a conventional manner for oscillation, and although not shown, the forward portion of the tractor is supported in the usual manner by a transverse equalizer spring.

Bolted to each of the track frames 15 is a plate 19 provided with an outwardly extending ball-shaped trunnion 21, and mounted on each of the trunnions 21 is a socket 22 secured to the rear end of a forwardly extending push arm 23 and socket connections. The push arms 23 are of box construction having their cross sections tapering toward the ends and more appreciably converging at their forward ends 24, as clearly shown in Figure 3. Welded within the forward end 24 of each of the push arms is the shank 25 of a disc-shaped end member 26.

As shown in Figures 1, 2 and 3, the pusher arms carry a tool or implement generally designated by the reference numeral 27. Implement 27 is a fabricated structure comprising a curved moldboard 28 having a detachable cutting edge 29 and an integrally welded blade reinforcing plate 30. Extending rearwardly from the blade reinforcing plate 30 are gusset members 30ª (see Figure 1) welded both to the blade reinforcing plate 30 and to vertically disposed inside cheek plates 31. Similarly disposed outside cheek plates 31ª are welded directly to the blade reinforcing plate 30 in spaced relation with respect to the cheek plates 31 for the reception therebetween of the forward ends of the push arms 23. Welded to the upper and lower edges of the cheek plates 31 and 31ª is a top plate 32 and a bottom plate 33, and welded to the ends of the moldboard 28 and the reinforcing plate 30 are end plates 32ª. Fastened to the inside face of each of the cheek plates 31 is a bushing 34, and mounted in each of these bushings is an outwardly extending pin 35. Each pin is detachably secured within its bushing by a keeper pin 35ª and extends through bores formed in the cheek plates and in the pusher arms. Due to this construction, each end of the tool or implement 27 is free to move or be cocked about the axis of the pin 35.

Extending through and welded to each end of the top plate 32 in substantial alignment with the disc-shaped end members 26 is a bearing sleeve 36, and journaled within the sleeve 36 is the shank 37 of screw 38 (see Figure 3). Vertical displacement of the screw 38 within the sleeve 36 is prevented by a flange formed on the shank 37.

Threaded within the upper end of the shank 37 is a shank extension 40 and keyed to the upper end of the shank extension 40 between a pair of washers 41 and 41ª is a ratchet wheel 42 formed with ratchet teeth 42ª. Disposed over the ratchet wheel 42 is the head 43 of a wrench 44, the head 43 being of slightly less depth than the ratchet wheel 42, so as to permit the head to turn freely between the two washers 41 and 41ª. Slidably accommodated within a recess in the wrench head 43 is a radial pawl 43ª urged inwardly by a spring 45. Threaded over the end of the shank extension 40 is a nut 45ª serving to lock the ratchet wheel between the two washers 41 and 41ª and to the upper shank 37. With this construction each of the screws 38 can be rotated within its bearing sleeve 36, it being understood that both sides of the tool or implement 27 are symmetrical in this respect. Also, it is to be observed that by rotation of the pawl 43ª on its own axis through 180° the wrenches 44 are operatable to rotate their associated screws 38 either clockwise or counterclockwise as desired.

Mounted on the lower end of each of the screws 38 between the cheek plates 31 and 31ª is a threaded sleeve or nut 47 formed integral with a box-shaped socket 48 for snugly accommodating the disc-shaped end member 26. Secured to the sleeve 47 is a gauge rod 49 extending upwardly through a guide sleeve 50 welded to the top plate 32. Formed along the upper length of the rod 49 are a plurality of annular gauge rings 51 for visually indicating the relative position of the sleeve 47 with respect to the screw 38 and, therefore, the relative angular position of each end of the tool or implement 27 with respect to its associated pusher arm. In this connection, it is to be noted that since the screw 38 has no longitudinal movement with respect to its bearing sleeve 36 and the nut or sleeve 47 is fixed against rotary movement, rotation of the screw 38 will of necessity raise or lower the sleeve 47 with respect to the screw. This in turn will cause the implement 27 to tilt or cock about the axis of its associated pin 35. Both ends of the implement may be tilted in the same clockwise direction or in opposed directions as desired in order properly to position the implement with respect to the ground. When the proper adjustment of the implement has been made, the handles of the two wrenches 44 are locked under clips 52 carried by the implement 27 (see Figure 1).

In accordance with my invention I provide means for raising and lowering the implement 27, and this is preferably a hydraulic means such as shown in Figures 1 and 2 and more completely described in principle in the Ellsworth W. Austin Patent No. 2,341,853, issued February 15, 1944. In view of this reference, a complete detailed description of the hydraulic mechanism is deemed unnecessary here. Referring to Figures 1 and 2, briefly, hydraulic jacks 61 are employed for connecting the implement 27 with brackets 62 mounted on the main body portion 12 of the tractor, pins 63 being arranged on overhanging lugs 64, about which the hydraulic jacks 61 are free to pivot during the raising and lowering of the implement. The piston rods 65 of the jacks are provided with knuckle joints 66 to allow for the implement 27 to be tilted and operated without regard to the adjusting action taking place when the jacks become actuated by the hydraulic fluid transmitted to them through pipes 67 from the control valve 68 placed for the convenience of the operator. A conventional rotary type pump, not shown, driven from the tractor engine is arranged to supply oil pressure to the system. The application of the oil pressure being utilized to operate the jacks to raise and lower the implement in accordance with the operator's manipulation of the control valve. It is understood that, since the jacks are inter-communicative in respect to the oil flow, one of these may be more or less extended to suit the particular condition arising at the moment, should the implement be adjustably tilted by the screw jack action of either or both of the screws 38.

Under certain conditions it is desirable to operate the structure by utilizing a cable lifting apparatus in lieu of the hydraulic lifting system above described, and in Figures 7 and 8 the objects of my invention have been embodied in a machine of this general type. In order properly to compensate for the screw jack adjustment of the implement in this case, I make use of an arched sheave pin 71, shown in Figure 8, mounted centrally on the upper portion of the implement 27, through brackets 72 welded thereto. Mounted on the pin 71 for movement thereon is sheave 73 provided as shown in Figures 7 and 8 with a pair of opposed depending ears 74. Carried by the ears 74 is a bolt 75, and mounted on this bolt is a roller 76 having a concave periphery on which the pin 71 is supported.

Straddling the engine housing 13 and secured to the tractor main frame 12 is an overhead frame 77. Mounted centrally from the cross member of this frame is a sheave 78 in alignment with the sheave 73. Both of the sheaves 73 and 78 carry sheave wheels 79 and 79ª respectively, about which is reeved a four part cable line 80 passing to the rear of the tractor and connecting with a power winch in a conventional manner. In all other respects the machine illustrated in Figures 7 and 8 can be made in accordance with the structure shown in Figures 1 to 6 inclusive.

In Figures 9 and 10, further objects of my invention have been illustrated as applied to a standard self track laying tractor of the same type as shown in Figures 1 and 2, and including a tractor main frame 91, tractor side frames 92 and push arms 93. In this modification, however, the push arms are pivoted at their rear ends to the tractor side frames between the tractor main frame and the side frames by ball and socket connections of the type shown in Figure 6.

Extending across the forward end of the machine is a U-shaped cross frame 94 of box-form construction connected at either end to the push arms 93 by pins 95. The ends of the push arms terminate in disc-shaped members 96 snugly accommodated within a box-shaped socket 97 carried by the lower end of a non-rotatable nut or internally threaded sleeve 98. Welded to each end of the cross frame 94 in axial alignment with the nut 98 is a jack screw bearing sleeve 99 in which is journaled the shank 101 of a jack screw 102. Operatively associated with a shank extension 103 is a ratchet wrench 104, the construction of the jack screw, ratchet wrench and associated parts being identical with the construction illustrated in Figures 3, 4 and 5, except that in the instant modification, a sprocket wheel 130 is fastened to each of the shank extensions 103 and a chain 131 operatively associated therewith. As shown in Figure 9, the two reaches of the chain 131 are parallel and consequently the rotation of one of the shank extensions 103 will cause both ends of the bulldozer blade either to raise or lower depending on the direction of rotation of the shank extension. By crossing the reaches of the chain, which will require a longer chain, the rotation of one of the shank extensions can be made to raise one end of the blade and simultaneously lower its opposite end. In this modification then, it is possible to cock or tilt either or both ends of the cross frame 94 with respect to the forward ends of the push arms 93.

Swiveled to the cross frame 94 centrally thereof is a working tool or implement 106, this connection being made by a pin 107 journaled in the cross frame 94 and by a pin 108 extending through hinge lugs 109 welded to the rear side of the implement 106 and through the head of the pin 107 at right angles thereto. As a result of this structure, the implement 106 is free to rotate on the axis of the pin 107, as well as on the axis of the pin 108, irrespective of the angle which the cross frame 94 is made to assume by the screw jacks 102.

Although due to the swivel connection between the implement and the cross frame, the implement is capable of universal movement with respect to the cross frame, provision is made, as shown in Figure 9, for locking the implement in any selected one of a number of angular positions. The structure resorted to for accomplishing this result is described in considerable detail in my co-pending application Serial No. 431,033, filed February 16, 1942. Briefly, this structure comprises a bracket 111 welded to each end of the implement, and opposed brackets 112 welded to each side of the cross frame 94. Secured to and between each pair of these opposed brackets is an articulated or foldable push pole 113 comprising a link 114 pivoted to the bracket 111 and arranged to be locked to a link 115 by pins 116 and 117, or to be locked directly to its associated bracket 112 as shown in dash line on the left-hand side of Figure 9. The link 115 as shown on the right-hand side of this figure can be secured to the bracket 112 at any one of a number of points, two such points being shown. It may be noted that when tilting of the implement 106 takes place, the cross frame 94, the implement 106 and the associated links, such as 114 and 115, may be considered for all practical purposes as a unit.

For the purpose of raising and lowering the implement 106, a pair of spaced apertured ears 121 are welded centrally of and to the cross frame 94 for the reception of a pin 122. Mounted on this pin is sheave 123 through which is reeved a cable 124 passing upwardly over an opposed sheave not shown and then to a cable winch in any well known manner. It will, of course, be understood that in lieu of spaced apertured ears 121 and pin 122, the arrangement shown in Figure 8 using a bent pin such as 71 may be made use of. Obviously, the sheave mounting illustrated in Figure 8 can be substituted for that illustrated in Figures 9 and 10.

I claim:

1. An earth mover comprising: a tractor; push arms pivoted to said tractor on either side thereof; a U-shaped tool supporting member pivoted to said push arms to the rear of the forward ends thereof; a jack screw journaled in each end of said tool supporting member and longitudinally immovable with respect thereto; a non-rotative sleeve threaded to said jack screw and provided with a socket for the reception of the end of one of said push arms; and means for turning said jack screw in either direction.

2. An earth mover comprising a tractor, push arms pivoted to said tractor on either side thereof, a tool supporting member having rearward extensions, means pivoting said extensions to said push arms rearwardly of the forward ends of said push arms, a pair of jack screws journalled in said tool supporting member and longitudinally immovable with respect thereto, non-rotative sleeve members respectively threaded to said jack screws, each of said sleeve members including a socket for receiving the end of one of said push arms, and means for turning said jack screws in either direction.

ELLSWORTH W. AUSTIN.

REFERENCES CITED

The following references are of record in the file of this patent:

UNITED STATES PATENTS

| Number | Name | Date |
|---|---|---|
| 1,964,360 | Le Tourneau | June 26, 1934 |
| 2,173,158 | Corbett | Sept. 19, 1939 |
| 2,173,406 | Wilkinson | Sept. 19, 1939 |
| 2,215,025 | Austin | Sept. 17, 1940 |
| 2,408,268 | Peterson et al. | Sept. 24, 1946 |